US006320516B1

(12) United States Patent
Reason

(10) Patent No.: US 6,320,516 B1
(45) Date of Patent: Nov. 20, 2001

(54) AIRPORT AND RUNWAY LASER LIGHTING METHOD

(76) Inventor: Richard E. Reason, 135 Ridge Dr., Woodland Park, CO (US) 80863

( * ) Notice: Subject to any disclaimer, the term of this patent is extended or adjusted under 35 U.S.C. 154(b) by 0 days.

(21) Appl. No.: 09/528,567

(22) Filed: Mar. 20, 2000

(51) Int. Cl.$^7$ ...................................................... G08G 5/00
(52) U.S. Cl. ........................ 340/953; 340/947; 340/952; 340/954
(58) Field of Search .................................. 340/947, 951, 340/952, 953, 954, 955, 956, 945; 73/178 T; 701/16

(56) References Cited

U.S. PATENT DOCUMENTS

| | | | |
|---|---|---|---|
| 3,940,060 | * | 2/1976 | Viets ........................................ 239/14 |
| 4,196,346 | * | 4/1980 | McElhannon ........................ 340/953 |
| 4,249,158 | * | 2/1981 | Basov et al. .......................... 340/952 |
| 4,309,746 | * | 1/1982 | Rushworth ............................ 362/259 |
| 5,043,726 | * | 8/1991 | Shifrin .................................. 340/953 |
| 5,287,104 | * | 2/1994 | Shemwell ............................. 340/956 |
| 6,028,535 | * | 2/2000 | Rizkin .................................. 340/953 |
| 6,193,190 | * | 2/2001 | Nance ................................... 340/953 |

OTHER PUBLICATIONS

Popular Science, "Slope Lights Funnel Planes In", p. 161, mar. 1949.*

* cited by examiner

*Primary Examiner*—Brent A. Swarthout
(74) *Attorney, Agent, or Firm*—G. F. Gallinger

(57) ABSTRACT

FAA regulations mandate that a pilot must have sufficient visibility to see the airport, and then the runway before landing; and sufficient visibility to see a substantial portion of the runway before taking off. In adverse weather conditions when visibility is reduced flights are cancelled, delayed, and rerouted to land where visibility is adequate. Poor visibility is one of the major causes of air traffic fatalities. One aspect of this invention discloses a method of illuminating an aircraft landing location to facilitate identification and aircraft guidance thereto comprising the following steps: projecting a laser beam upwardly from the location so that an aircraft may be better able to target the landing location particularly in conditions of poor visibility. A preferred aspect of this invention provides for a method as above wherein the landing location comprises a runway and wherein the laser beam is projected upwardly from the runway and in a direction of the approach to the runway so that aircraft wanting to land can be guided to the runway. Most preferably the beam oscillates up and down so that generally a triangular wall of light is projected. With two beams, each projected from an opposite side of the runway and each projecting upwardly, towards the approach to the runway, and slightly away from a centerline of the runway side portions of a funnel indicating an approach to the runway may be projected.

10 Claims, 1 Drawing Sheet

AIRPORT AND RUNWAY LASER LIGHTING METHOD

FIELD OF THE INVENTION

This invention relates to airport safety and the lighting of runways. More particularly this invention relates to a method of illuminating runways so that their visibility from the air remains adequate even in adverse weather conditions.

BACKGROUND OF THE INVENTION

FAA regulations mandate that a pilot, at set altitudes while descending to land, must have sufficient visibility to first see the airport, and then the runway. If at the predetermined altitudes the pilot is unable to either see the airport or the runway he is required to abort landing. When about one thousand feet from the runway, about one hundred feet up, and while travelling at about one hundred and eighty mph the pilot has about seven seconds to commit to landing.

On January 26'th of this year eleven people were killed and 89 injured on American Airlines flight 1420. About 5 minutes before touchdown Captain Richard Buschman said he hated droning around without having some clue where he was. Heavy rain had reduced visibility to less than a mile. Captain Richard Buschman exclaimed "Were off course" when the plane was several hundred feet from the runway—moments before he died. The plane touched down with its main landing gear to the right of the runway and its nose pointing to the left.

The FAA also mandates that a pilot have at least 600 feet of runway centerline clearly visible prior to and during take-off. In snow, fog, or heavy rain this is not possible. Although airborne conditions may be fine, runway visibility may keep planes grounded, or airborne when they want to land. Improving runway visibility in adverse weather could save millions of dollars a day at busy airports. It would also reduce delays, improve flight reliability, and enhance customer relations.

Rerouting due to poor visibility due to adverse weather is a particularly acute problem when airports are operating near full capacity. Delays are compounded.

Visibility is even more critical in the military. When landing on an aircraft carrier, the runway is short and narrow. The pilots must precisely position their plane and snag a rope to decelerate rapidly. Visibility is frequently poor. And there is no other place to land. Visibility is also sometimes a problem at NASA. If Cape Canaveral is overcast shuttles must continue in orbit, or alternatively, land in California and be air transported back to Cape Canaveral.

A better method of illuminating airports and runways is needed. The system of illumination which is needed must be able to penetrate rain, fog, and snow, so that visibility is extended in adverse weather conditions.

OBJECTS OF THE INVENTION

It is an object of this invention to disclose an improved method of illuminating airports and runways. A method is disclosed using laser light which is much better able to be seen penetrating through particulates than conventional lighting. It is an object of this invention to disclose a method of illumination which will improve visibility in adverse weather conditions. It is yet a further object of this invention to disclose a method of illumination which will allow a pilot to ascertain the slope of his descent to a runway without feedback from the ground. It is yet a further object of this invention to disclose a system of runway lighting which will have particular application on aircraft carriers, where precise positioning on a small target runway in adverse weather conditions is frequently necessary. It is yet a further application of this invention to disclose a system of runway lighting which will have application for NASA where extended visibility would also prove to be advantageous. It is a final object of this invention to disclose a system of illumination which will simplify the task of landing. A system that will allow a pilot merely to fly into a funnel—which would indicate his relative position and orientation relative to a runway—and then be channeled into the runway which might not otherwise be visible.

One aspect of this invention discloses a method of illuminating an aircraft landing location to facilitate identification and aircraft guidance thereto comprising the following steps: projecting a laser beam upwardly from the location so that an aircraft may be better able to target the landing location particularly in conditions of poor visibility.

A preferred aspect of this invention provides for a method as above wherein the landing location comprises a runway and wherein the laser beam is projected upwardly from the runway and in a direction of the approach to the runway so that aircraft wanting to land can be guided to the runway. Most preferably the beam oscillates up and down so that generally a triangular wall of light is projected. With two beams, each projected from an opposite side of the runway and each projecting upwardly, towards the approach to the runway, and slightly away from a centerline of the runway side portions of a funnel indicating an approach to the runway may be projected.

Another preferred aspect of this invention provides for illuminating the perimeter of the runway with a laser beam so that a pilot is better able to see the runway when taking off in poor weather.

Various other objects, advantages and features of this invention will become apparent to those skilled in the art from the following description in conjunction with the accompanying drawings.

FIGURES OF THE INVENTION

Figure 1:
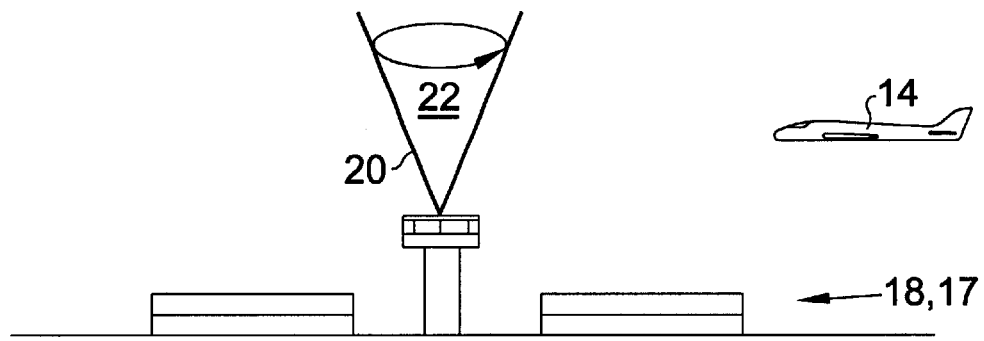
FIG. 1 is an elevational view of an airport having an upwardly projected revolving laser beam to identify the location of the airport.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have an elevational view of an airport 18 having an upwardly projected revolving laser beam 20 to identify the location of the airport 18. An aircraft landing location 17 is defined in this application to include either or both of an airport 18, or a runway 16. A method of illuminating an aircraft landing location 17 to facilitate identification and aircraft guidance thereto comprises the following step: projecting a laser beam 20 upwardly from the location 17 so that an aircraft 14 may be better able to target the landing location 17 particularly in conditions of poor visibility. To better attract attention, the laser beam 20 may circle so that its trajectory forms a cone 22. The laser beam 20 may also be colored to identify the particular landing location 17. This color might be one color selected from a color code which would identify the size and military or civilian nature of the airport 17. The Miami and Oploka airport, only 30 miles apart have the same layout and look the same from the air. They are easily mistaken. One pilot told us how he mistakenly landed in Oploka. Another pilot recited how he was met with F-16s when he mistakenly attempted to land at the McDill military airport rather than in nearby Tampa.

Figure 2:
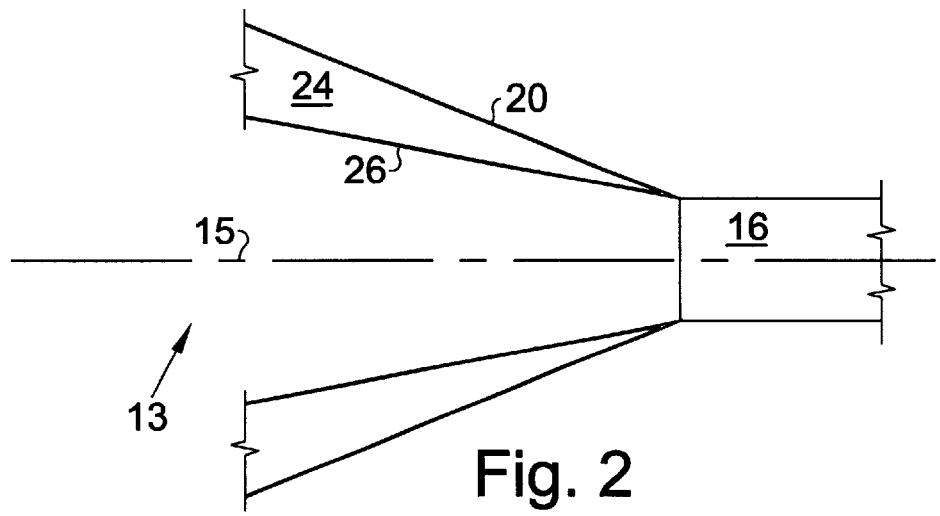
FIG. 2 is an aerial view of a runway having two laser beams projected upwardly, towards an approach to the runway, and slightly away from a centerline of the runway, from opposite sides of the runway.

FIG. 2 is an aerial view of a runway 16 having two laser beams 20 projected upwardly, towards an approach 13 to the runway 16, slightly away from a centerline 15 of the runway 16, and from opposite sides of the runway 16. Most preferably the laser beams 20 oscillate up and down so that generally a triangular wall of light 24 is projected. Together the two oscillating beams 24 project the side portions of a funnel indicating an approach 13 to the runway 16. Most preferably the laser beams 20 are projected to indicate a correct glide slope 26 for an approach to the runway 16 so that an aircraft 14 can readily determine if it is in the correct glide slope 26 without the necessity of feedback. In FIG. 2 the correct glide path 26 is indicated by the bottom portion of the oscillating laser beam 20.

Figure 3:
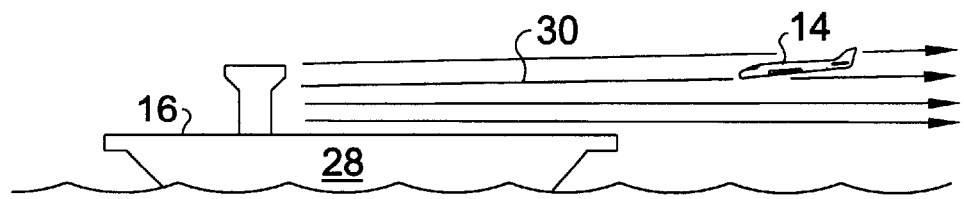
FIG. 3 is an elevational view of an aircraft carrier having a plurality of spaced horizontal laser beams to indicate the elevation of the runway to an aircraft.

FIG. 3 is an elevational view of an aircraft carrier 28 having a plurality of spaced horizontal laser beams 30 to indicate the relative elevation of the runway 16 to the aircraft 14. Landing on an aircraft carrier 18 runway 16 is a relatively small target for an aircraft 14. It is mandatory to touchdown close to the threshold of the runway 16 and to snag a cable (not shown) for rapid deceleration.

Figure 4:
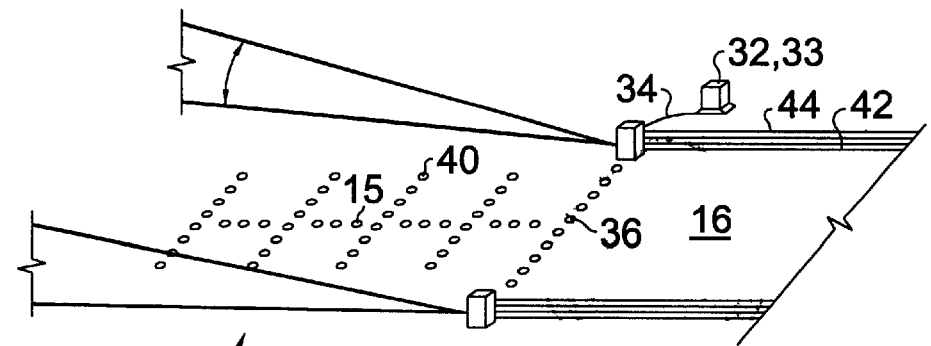
FIG. 4 is a partial aerial perspective view of the approach to a runway and a runway illuminated with a gas laser.

FIG. 4 is a partial aerial perspective view of the approach to a runway 13 and a runway 16, both illuminated with a gas laser 32. Most preferably the gas laser is the argon helium type. Fiber optic cable 34 runs from the gas laser generation unit 33 to transmit the laser beam 20 to light emitting locations. Light emitting locations include a threshold 36 to the runway 16, a centerline 15 of the runway 16, and spaced cross lights 40 along the centerline 15. It is contemplated that these lights will be color coded, red, blue, and green to correspond to standard color coding in runway approach lighting systems. The perimeter 42 of the runway may also be indicated. Most preferably this is accomplished with ropes of light 44 extending like a fence around the runway 16. These perimeter ropes of light 14 would enable an aircraft 14 taking off in poor visibility to see the runway 16 when he otherwise would be unable to see the runway 16. Most preferably the ropes of light 44 would be color coded and could flash to transmit information, such as currently used VASI (visual approach slope indicator) information to the aircraft 14 in the event of a radio failure. A colored light could also be used to distinguish and identify a particular runway 16 at a given airport. This would ensure that in poor visibility an aircraft 14 was using the correct runway 16.

While the invention has been described with preferred specific embodiments thereof, it will be understood that this description is intended to illustrate and not to limit the scope of the invention, which is defined by the following claims.

I claim:

1. A method of illuminating a runway wherein a plurality of laser beams, at varying elevations above the runway are horizontally projected so that approaching aircraft may accurately ascertain their elevation relative to the runway.

2. A method as in claim 1 wherein there are a plurality of beams which are color coded which may flash to communicate information in the event of a failure of radio communication.

3. A method as in claim 1 further comprising a laser beam indicating a centerline to, and a threshold of the runway.

4. A method as in claim 3 wherein the laser beam is color coded and further comprises spaced cross lights along and across the centerline of the runway.

5. A method as in claim 3 wherein the laser beam indicates a perimeter of the runway.

6. A method as in claim 4 wherein a laser beam on the runway is color coded to identify the runway from other runways.

7. A method as in claim 1 wherein the laser beam has insufficient intensity to damage the human eye without direct viewing for a sustained period.

8. A method as in claim 1 wherein the laser beam is generated by an argon helium laser and wherein fiber optic cable is used to transmit the beam to an emitting locations.

9. A method as in claim 1 wherein the laser beam is generated by a solid state laser.

10. A method of guiding an aircraft to a runway comprising the following steps:

projecting a first and second laser beam upwardly from an approach end of the runway;

rapidly oscillating the beams up and down so that each generally projects an upright triangular wall of light which corresponds to acceptable landing approach, glide path elevations, so that a pilot may readily ascertain if the aircraft is approaching the runway at an acceptable elevation;

wherein the first laser beam is projected slightly away from one side of a centerline of the runway, and wherein the second laser beam is projected slightly away from the other side of the centerline of the runway, so that side portions of a funnel are projected, said side portions of the funnel circumscribing acceptable directions of glidepaths to the runway;

whereby a pilot may readily ascertain by himself, if the aircraft is acceptably approaching the runway, and what if any corrections to the elevation and direction of the glidepath he should make.

* * * * *